No. 715,006. Patented Dec. 2, 1902.
J. A. BOMGREN.
BUSHING.
(Application filed June 27, 1902.)
(No Model.)
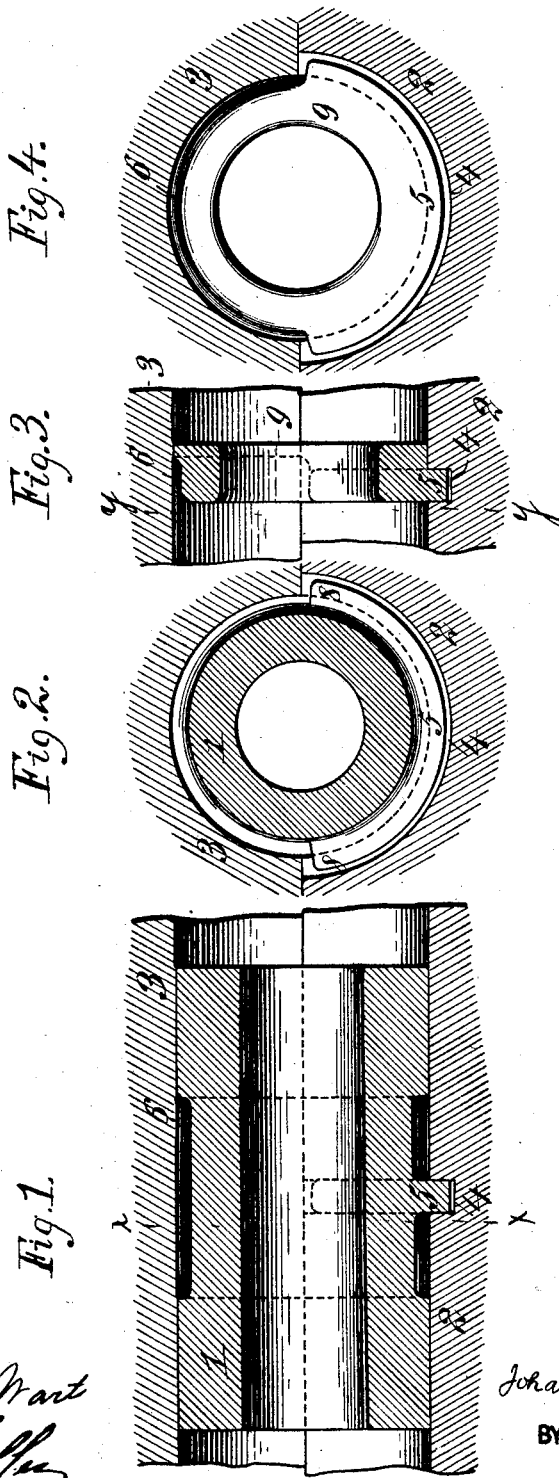
WITNESSES:
INVENTOR
Johan Axel Bomgren
BY
his ATTORNEY

UNITED STATES PATENT OFFICE.

JOHAN AXEL BOMGREN, OF JERLA, SWEDEN.

BUSHING.

SPECIFICATION forming part of Letters Patent No. 715,006, dated December 2, 1902.

Application filed June 27, 1902. Serial No. 113,517. (No model.)

*To all whom it may concern:*

Be it known that I, JOHAN AXEL BOMGREN, a subject of the King of Sweden and Norway, residing at Jerla, Sweden, have invented a new and useful Improvement in Bushings, of which the following is a specification.

The invention relates to bushings, bottom rings for packing, and the like which are usually inserted in cylindrical openings.

The object of my invention is to enable the bushing to be readily inserted in proper position and locked in place, so that it cannot be rotated.

In the accompanying drawings, Figure 1 is a longitudinal section of a bushing embodying my invention seated in a suitable opening. Fig. 2 is a cross-section on the line $x\ x$ of Fig. 1. Fig. 3 shows in longitudinal section the invention applied to a bottom packing-ring, and Fig. 4 is a cross-section on the line $y\ y$ of Fig. 3.

Similar numbers of reference indicate like parts.

Referring first to Figs. 1 and 2, the bushing 1 is shown in a two-part bearing divided, as usual, longitudinally. In the semicylindrical concavity of the lower half 2 of the bearing is a groove 4. On the exterior of the bushing is a semicircular rib 5, adapted to enter the groove. The bushing is preferably reduced in diameter at its middle portion, as shown at 6, so that the bushing with its rib can be conveniently formed by turning the lathe.

In assembling, the upper half-bearing 3 being removed, the bushing 1 is placed in the lower half-bearing 2, with its rib 5 in the groove 4. The position of the bushing axially of the bearing is thus determined. When the upper half-bearing is applied, it locks the rib in place, the ends 8, Fig. 2, of the rib abutting against the lower face of the bearing when the bushing is rotated on its axis slightly in either direction.

In Fig. 3 the packing-ring 9 has a rib 5 and is reduced in diameter over the semicircumference opposite said rib. The rib, as before, enters the groove 4 in the lower half-bushing and is locked in place by the upper half. The rib is especially advantageous in bottom packing-rings, since it supports the ring against axial pressure and is preferable to the ordinarily-employed pins and the like.

I claim—

1. In combination with a two-part bearing, having in the concavity of one part a transverse groove closed by the abutting portion of the other section, a cylinder adapted to enter said bearing and provided on a portion of its circumference with a transverse rib constructed to enter said groove, substantially as described.

2. In combination with a two-part bearing having in the concavity of one part a transverse groove, a cylinder adapted to enter said bearing having a portion of its exterior of less diameter than the bore of the bearing and provided with a transverse rib on said reduced portion; the said rib being constructed to enter said groove and prevent the cylinder rotating, substantially as described.

3. In combination with a two-part bearing having in the concavity of one part a transverse groove, a hollow cylinder adapted to enter said bearing provided with a transverse rib and having a constricted portion opposite said rib; the said rib being constructed to enter said groove, substantially as described.

In testimony whereof I have signed my name to this specification in the presence of two subscribing witnesses.

JOHAN AXEL BOMGREN.

Witnesses:
 WALDEMAR BOMAN,
 TH. RIDDERSTOLPE.